(12) United States Patent
Weber et al.

(10) Patent No.: US 8,465,863 B2
(45) Date of Patent: Jun. 18, 2013

(54) BATTERIES AND COMPONENTS THEREOF AND METHODS OF MAKING AND ASSEMBLING THE SAME

(75) Inventors: Derek R. Weber, Rochester, NY (US); Alastair Gordon Anderson, Wiesbaden (DE); Steven J. Spencer, Rochester, NY (US); Paul F. Spacher, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 695 days.

(21) Appl. No.: 12/403,566

(22) Filed: Mar. 13, 2009

(65) Prior Publication Data

US 2009/0258288 A1 Oct. 15, 2009

Related U.S. Application Data

(60) Provisional application No. 61/043,530, filed on Apr. 9, 2008.

(51) Int. Cl.
*H01M 10/50* (2006.01)

(52) U.S. Cl.
USPC .......................................... 429/120

(58) Field of Classification Search
USPC ........................................................... 429/120
See application file for complete search history.

(56) References Cited

U.S. PATENT DOCUMENTS

| 5,695,891 | A | 12/1997 | Misra et al. |
| 6,162,559 | A | 12/2000 | Vutetakis et al. |
| 2004/0096715 | A1 | 5/2004 | Herdtle et al. |
| 2006/0204840 | A1* | 9/2006 | Jeon et al. ..................... 429/152 |
| 2008/0008916 | A1 | 1/2008 | Shin et al. |

FOREIGN PATENT DOCUMENTS

| CN | 10127809 A1 | 8/2007 |
| CN | 101106199 A | 1/2008 |

OTHER PUBLICATIONS

Robert Graban et al, U.S. Appl. No. 12/436,586, filed May 6, 2009, entitled "Battery Assembly With Immersed Cell Temperature Regulating".

* cited by examiner

*Primary Examiner* — Ula C Ruddock
*Assistant Examiner* — Frank Chernow
(74) *Attorney, Agent, or Firm* — BrooksGroup

(57) ABSTRACT

An exemplary embodiment includes a method of sealing battery cooling plates.

12 Claims, 4 Drawing Sheets

BATTERIES AND COMPONENTS THEREOF AND METHODS OF MAKING AND ASSEMBLING THE SAME

CROSS-REFERENCE TO RELATED APPLICATIONS

This application claims the benefit of U.S. Provisional Application No. 61/043,530 filed Apr. 9, 2008.

TECHNICAL FIELD

The field to which the disclosure generally relates includes batteries and components thereof, and methods of making and assembling the same, and in particular to battery cooling plates or fins.

BACKGROUND

For the efficient operation of some batteries, for example lithium ion batteries, it may be desirable to cool the battery. This may be accomplished by flowing a liquid coolant through a cooling plate or fin, which may be positioned adjacent to a battery cell or interposed between battery cells. As the commercial use of such battery increases, effective methods of making components thereof and manufacturing assembly operations become more important.

SUMMARY OF EXEMPLARY EMBODIMENTS OF THE INVENTION

One exemplary embodiment includes providing a battery cooling plate having a liquid coolant path defined therein communicating with an inlet header hole and an outlet header hole. Two cooling plates are stacked together and inlet and outlet header holes of each plate are aligned with the same of adjacent plates. Optionally, a frame may be provided for each plate. At least one of the cooling plate or the frame may include inlet header extensions and outlet header extensions. A seal may be provided and used to provide a plate-to-plate seal or a frame-to-plate seal.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the following detailed description and the accompanying drawings.

DETAILED DESCRIPTION OF EXEMPLARY EMBODIMENTS

The following description of the embodiment(s) is merely exemplary (illustrative) in nature and is in no way intended to limit the invention, its application, or uses.

Figure 1:
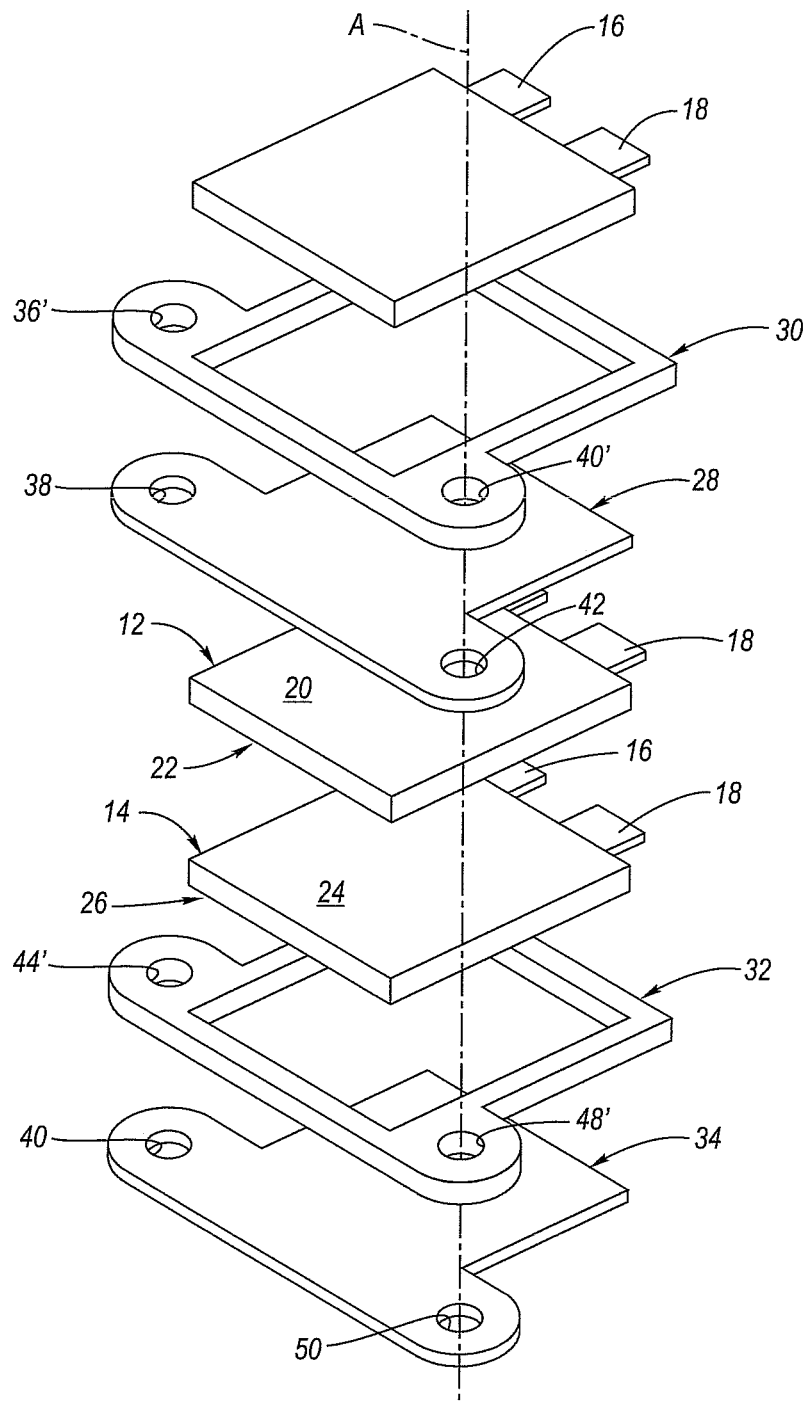
FIG. 1 is an exploded view of portions of a lithium ion battery.

FIG. 1 is an exploded view of portions of a lithium ion battery. The battery may include a first battery cell 12 and a second battery cell 14. Each of the first battery cell 12 and second battery cell may include a first terminal 16 and second terminal 18. The first battery cell 12 may include a first face 20 and an opposite second face 22. The second battery cell 14 may include a first face 24 and an opposite second face 26. The first battery cell 12 and second battery cell 14 may be positioned face to face, for example wherein the second face 22 is positioned adjacent to the first face 24. A first cooling plate 28 may be provided and may be positioned to contact the first battery 12, for example by engaging the first face 20. A first frame 30 segment may be provided and associated with the first cooling plate 28 and the first battery cell 12 to support the same. A second cooling plate 34 may be provided and positioned to contact the second battery cell 14, for example by engagement with the second face 26. A second frame 32 segment may be associated with the second cooling plate 34 and second battery cell 14 to support the same. Each cooling plate 28, 34 may include a single substrate being stamped or formed to provide a cooling fluid path therethrough or may be two substrates that may be welded or brazed together to provide a cooling fluid path therethrough.

Referring now to FIGS. 1-2, 3, 3A-3D in one exemplary embodiment, a first inlet header extension may be provided extending in an upward direction and a second inlet header extension may be provided extending in a downward direction from a plane extending through the main portion of the cooling plate. The inlet extensions may be provided by at least one of or a combination of the cooling plate (28, 34) or first frame 30. A first outlet header extension may be provided extending in an upward direction and a second outlet header extension may be provided extending in a downward direction from a plane extending through the main portion of the cooling plate. The outlet extensions may be provided by at least one of or a combination of the cooling plate (28, 34) or first frame 30 and may include a header extension or flange 36 having a through hole communicating with a first inlet or outlet header hole of an overlying cooling plate (not shown). Each extension includes a through hole so that inlet and outlet manifolds are provided to allow the flow of cooling fluid into and out of a stack of cooling plates. The second frame 32 and second cooling plate, and additions frames and cooling plates may be similarly constructed.

Figure 2:
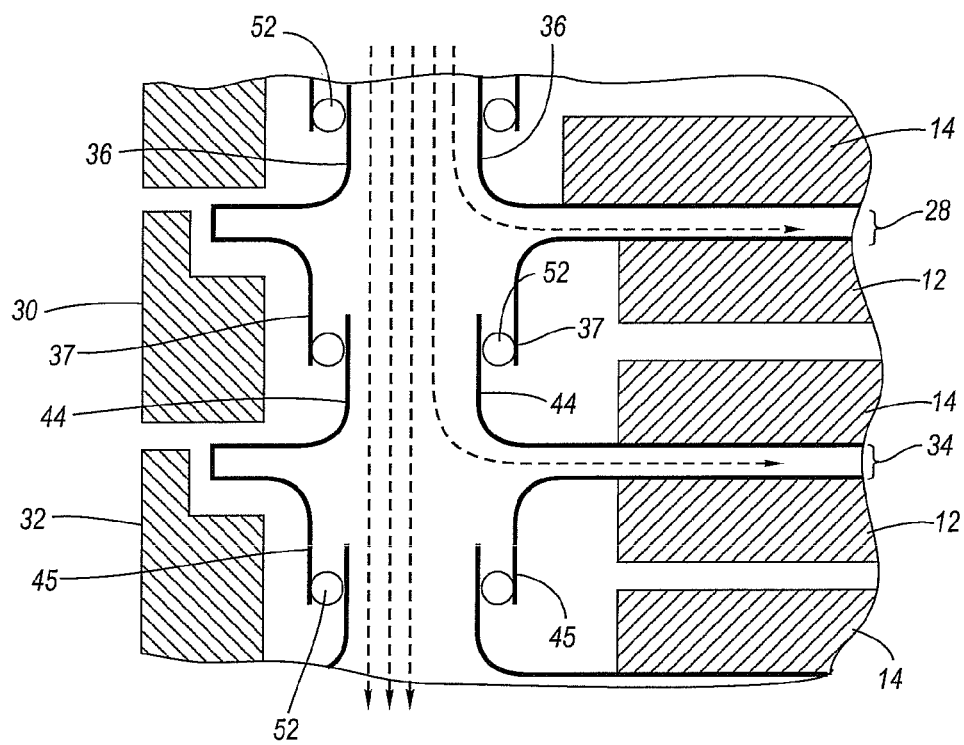
FIG. 2 is a section view illustrating a method of sealing battery cooling plate according to one exemplary embodiment.

Referring now to FIG. 2, in one exemplary embodiment, the first header extension 44 of the second frame 32 may be constructed and arranged to be received in the header hole 38. A seal 52 may be provided at the juncture of the first header extension 44 of the first cooling plate 28. The second header extension 48 of the first frame 30 may be received in the header hole 42 of the first cooling plate 28 and sealed.

Figure 3A:
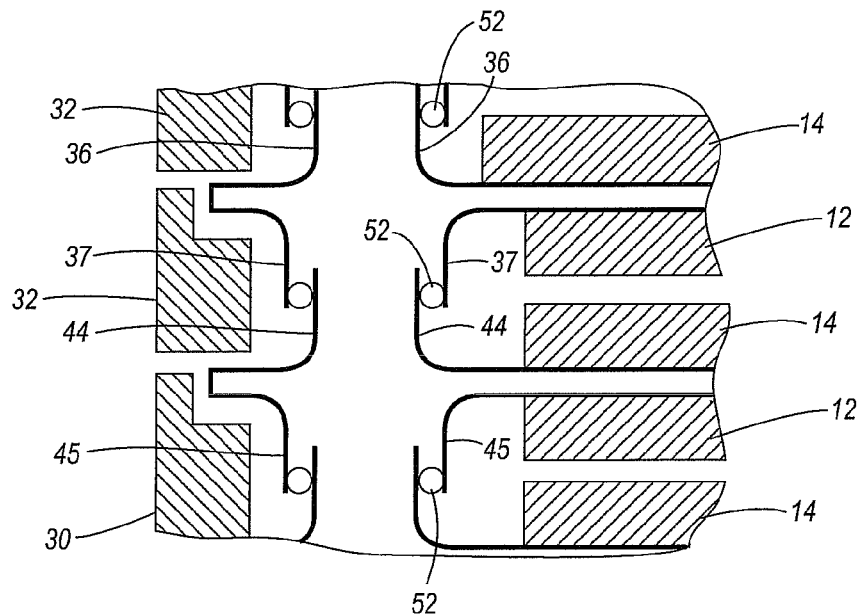
FIG. 3A is a section view illustrating a method of sealing battery cooling plate according to another exemplary embodiment.

Referring now to FIG. 1-2, in one exemplary embodiment, a first upward header extension 44 of the second cooling plate 34 may be constructed and arranged to be received in a first downward header extension 37 of the first cooling plate 28. A seal 52 may be provided at the juncture of the first upward header extension 44 of the second cooling plate 34 and seal directly to the first downward header extension 37 of the first cooling plate 28. In a similar manner a second header extension may be provided at outlet opening 50 of the second cooling plate 34 and may be constructed and arranged to be received in the second header extension provided at the outlet opening 42 of the first cooling plate 28. A seal 52 may be provided at the juncture of the second header extension at 42 of the first cooling plate 28 and seal directly to the second header extension at 50 of the second cooling plate 34. The seal may be either an axial o-ring or a compression seal as in FIG. 3. The seal may also be incorporated in the frames 30, 32. FIG. 3A illustrates one embodiment similar to FIG. 2 having an O-ring plate-to-plate seal the connection of plate extensions.

Figure 3B:
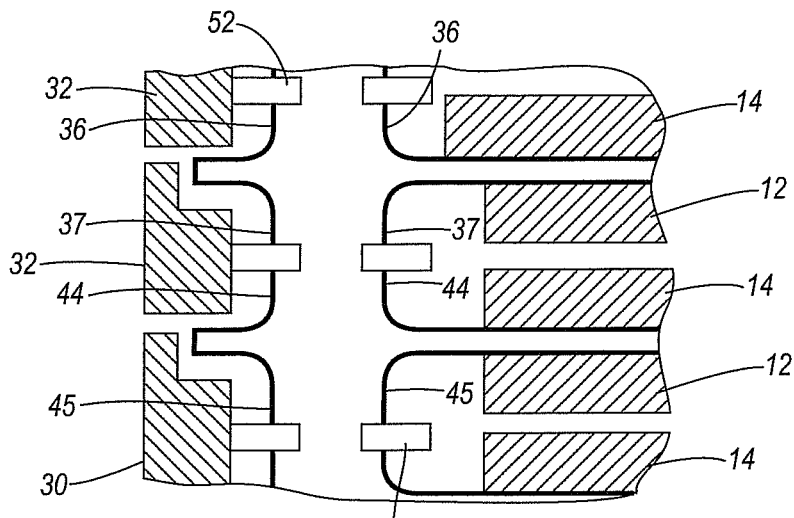
FIG. 3B is a section view illustrating a method of sealing battery cooling plate according to another exemplary embodiment.

Referring now to FIG. 3B, in one exemplary embodiment, the plate extensions 37 and 44, and 36 and 45 respectively are positioned in abutting manner with a compression seal 52 interposed between abutting extensions.

Figure 3C:
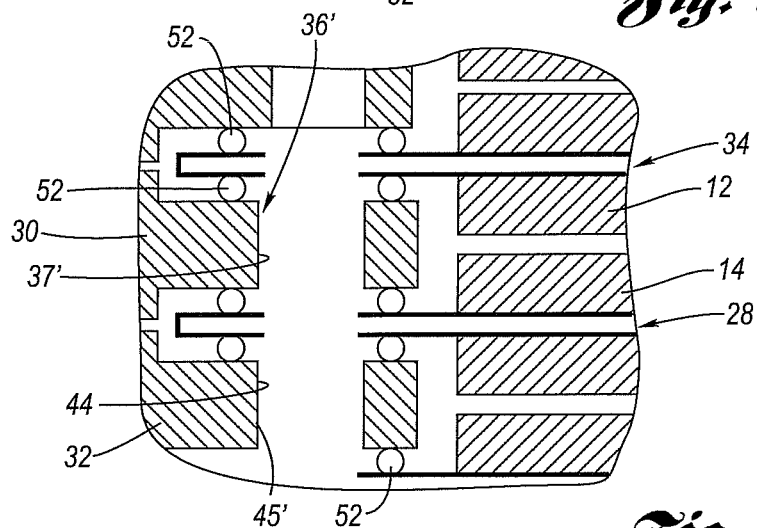
FIG. 3C is a section view illustrating a method of sealing battery cooling plate according to another exemplary embodiment.

Referring now to FIG. 3C, in one exemplary embodiment, the first frame 30 provides an upward extension 36' and a downward extension 37' with a through hole to provide a portion of a cooling fluid manifold to allow coolant to flow from one cooling plate to the next and into (or out of) the plates 28, 34. Similarly, the second frame 32 provides an upward extension 44' and a downward extension 45' with a through hole to provide a portion of a cooling fluid manifold to allow coolant to flow from one cooling plate to the next and into (or out of) the plates 28, 34. A frame-to-plate seal are provided using seal 52.

Figure 3D:
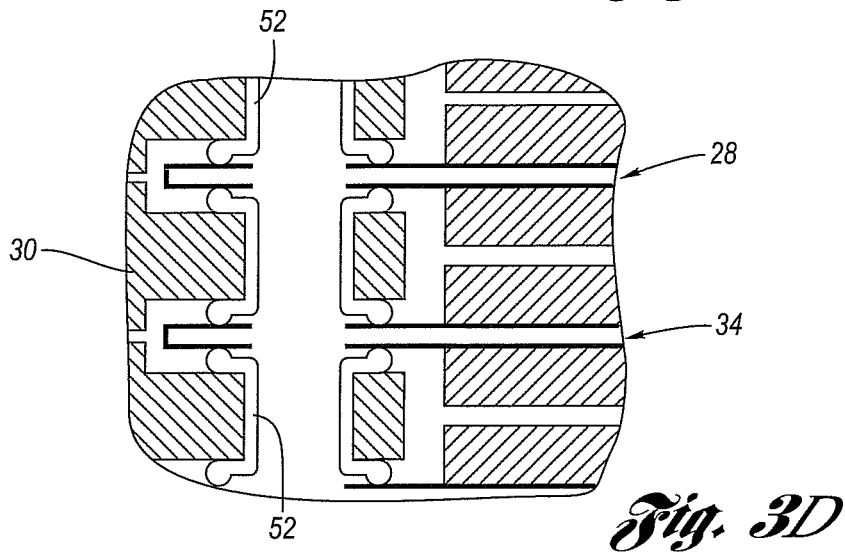
FIG. 3D is a section view illustrating a method of sealing battery cooling plate according to another exemplary embodiment.

Referring to FIG. 3D, in one exemplary embodiment, a one piece compression seal 52 wraps around a portion of the frame 30 to provide a frame-to-plate seal between the frame 30 and both the first cooling plate 28 and the second cooling plate 34.

Figure 4:
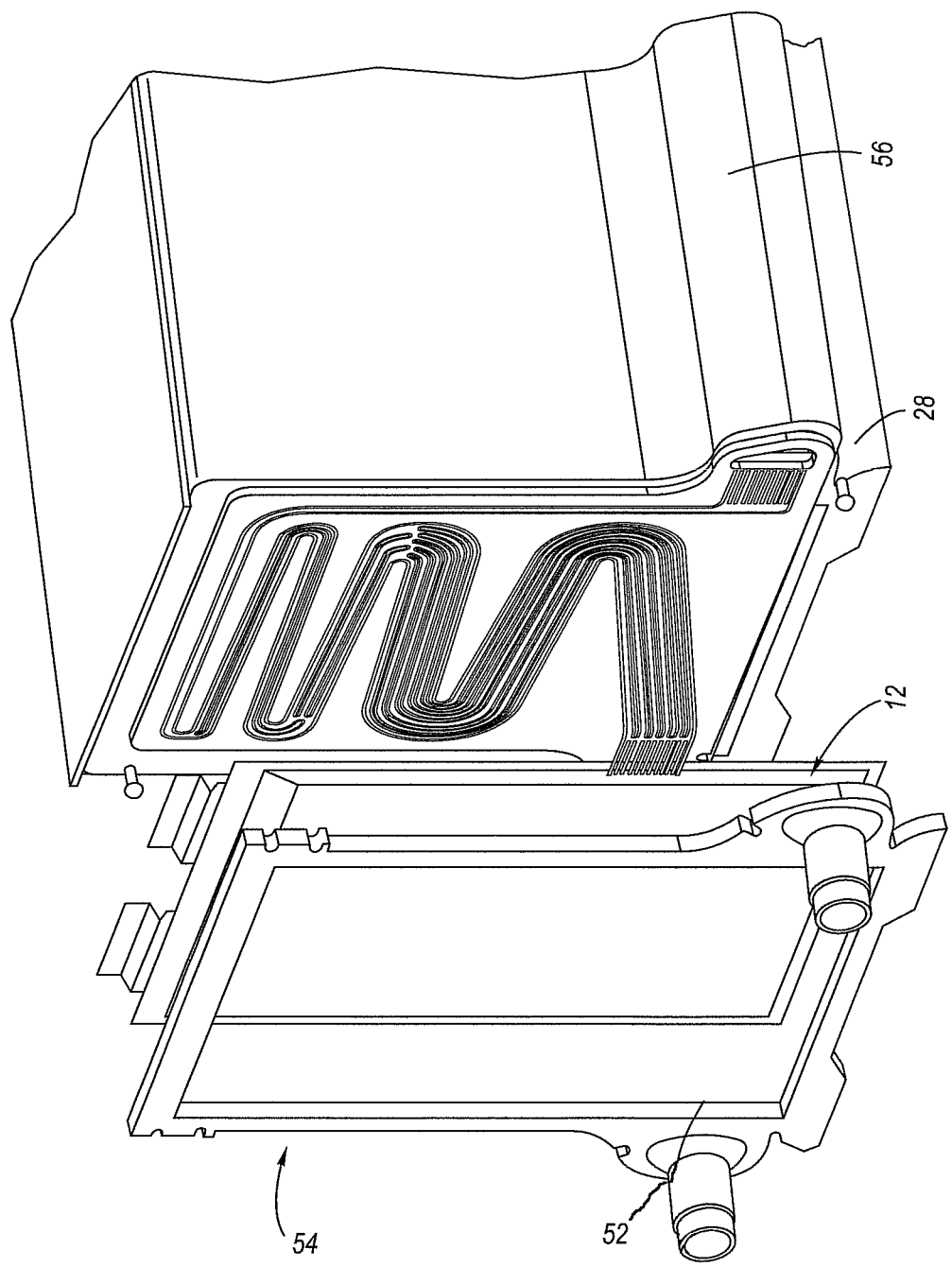
FIG. 4 is a partially exploded, perspective view of a battery according to one exemplary embodiment.

One exemplary embodiment is shown in FIG. 4, which may provide an end frame 54 for supporting a battery cell 12 and a cooling plate 28. An outlet manifold/perimeter face seal 52 may be provided. A series of repeating units including a battery cell 12 cooling plate, and frame 30 may be provided to make up the battery with the repeating units being held together by a compression rod 56.

The above description of embodiments of the invention is merely exemplary in nature and, thus, variations thereof are not to be regarded as a departure from the spirit and scope of the invention.

What is claimed is:

1. A battery comprising a battery cell positioned between a first cooling plate and a second cooling plate, the first and second cooling plates being supported by frame segments, a first inlet header extension provided extending in an upward direction and a second inlet header extension provided extending in a downward direction from a plane extending through the main portion of the first cooling plate, a first outlet header extension provided extending in an upward direction and a second outlet header extension provided extending in a downward direction from a plane extending through the main portion of the second cooling plate, and wherein the inlet and outlet extensions are provided by at least one of the frame segments, first cooling plate or second cooling plate or a combination thereof.

2. A battery as set forth in claim 1 further comprising a seal positioned to provide one of a plate-to-plate seal or a frame segment-to-plate seal.

3. A battery as set forth in claim 2 wherein the seal is one of an O-ring or compression seal.

4. A battery as set forth in claim 2 wherein the seal is a one piece seal that wraps around a portion of the frame segment to provide a frame segment-to-plate seal between the frame segment and the first cooling plate and a frame segment-to-plate seal between the frame segment and the second cooling plate.

5. A battery as set forth in claim 2 wherein the seal is a compression seal.

6. A battery comprising a battery cell positioned between a first cooling plate and a second cooling plate and at least one header defined circumferentially by first and second header inlet extensions, the first inlet header extension provided extending in an upward direction and the second inlet header extension provided extending in a downward direction from a plane extending through the main portion of the first cooling plate, a portion of the first inlet header extension being received in one of the first cooling plate or second cooling plate and a portion of the second inlet header extension being received in the other of the first cooling plate or second cooling plate, a first outlet header extension provided extending in an upward direction and a second outlet header extension provided extending in a downward direction from a plane extending through the main portion of the second cooling plate, a portion of the first outlet header extension being received in one of the first cooling plate or second cooling plate and a portion of the second outlet header extension being received in the other of the first cooling plate or second cooling plate, and wherein the inlet and outlet extensions are provided by at least one of a frame, the first cooling plate or the second cooling plate or a combination thereof.

7. A battery comprising a battery cell positioned between a first cooling plate and a second cooling plate and a header defined by at least frame segments, the first and second cooling plates being supported the frame segments, a first inlet header extension provided extending in an upward direction and a second inlet header extension provided extending in a downward direction from a plane extending through the main portion of the first cooling plate, a portion of the first inlet header extension being received in one of the first cooling plate or second cooling plate and a portion of the second inlet header extension being received in the other of the first cooling plate or second cooling plate, a first outlet header extension provided extending in an upward direction and a second outlet header extension provided extending in a downward direction from a plane extending through the main portion of the second cooling plate, a portion of the first outlet header extension being received in one of the first cooling plate or second cooling plate and a portion of the second outlet header extension being received in the other of the first cooling plate or second cooling plate, and wherein the inlet and outlet extensions are provided by at least one of the frame segments, first cooling plate or second cooling plate or a combination thereof.

8. The battery of claim 6 wherein the header is also defined by at least one seal.

9. The battery of claim 7 wherein the header is also defined by at least one seal.

10. A battery comprising a battery cell positioned between a first cooling plate and a second cooling plate, a first inlet header extension provided extending in an upward direction and a second inlet header extension provided extending in a downward direction from a plane extending through the main portion of the first cooling plate, a first outlet header extension provided extending in an upward direction and a second outlet header extension provided extending in a downward direction from a plane extending through the main portion of the second cooling plate, and a seal positioned to provide seal wherein the inlet and outlet extensions are provided by at least one of a frame, the first cooling plate or the second cooling plate or a combination thereof.

11. The battery of claim 10 wherein the seal is separate component and is position between adjacent plates to provide a plate to plate seal.

12. The battery of claim 10 wherein the seal is separate component and is position between a plate and a frame to provide a plate to frame seal.

* * * * *